United States Patent
Asbi et al.

(10) Patent No.: US 10,545,963 B2
(45) Date of Patent: Jan. 28, 2020

(54) GENERATING A PRIORITY LIST OF RECORDS USING INDICATOR DATA

(71) Applicant: ServiceNow, Inc., Santa Clara, CA (US)

(72) Inventors: Nabil Asbi, The Hague (NL); David van Heusden, Utrecht (NL)

(73) Assignee: ServiceNow, Inc., Santa Clara, CA (US)

( * ) Notice: Subject to any disclaimer, the term of this patent is extended or adjusted under 35 U.S.C. 154(b) by 534 days.

(21) Appl. No.: 15/338,845

(22) Filed: Oct. 31, 2016

(65) Prior Publication Data
US 2018/0121475 A1 May 3, 2018

(51) Int. Cl.
*G06F 16/2455* (2019.01)
*G06Q 10/06* (2012.01)

(52) U.S. Cl.
CPC ....... *G06F 16/24564* (2019.01); *G06Q 10/06* (2013.01)

(58) Field of Classification Search
CPC ... G06F 16/24564; G06Q 10/06; G06Q 10/63
USPC .......................................................... 707/748
See application file for complete search history.

(56) References Cited

U.S. PATENT DOCUMENTS

| | | | | |
|---|---|---|---|---|
| 8,135,679 B2* | 3/2012 | Bayliss | ................ | G06F 16/285 707/688 |
| 8,250,078 B2* | 8/2012 | Bayliss | ................ | G06F 16/285 707/749 |
| 8,316,047 B2* | 11/2012 | Bayliss | ................ | G06F 16/285 707/780 |
| 2008/0140473 A1 | 6/2008 | Taylor | | |
| 2009/0271363 A1* | 10/2009 | Bayliss | ................ | G06F 16/285 707/999.002 |
| 2011/0313817 A1 | 12/2011 | Wang | | |

OTHER PUBLICATIONS

Halogen Software, "Using Weighting to Prioritize Competencies and Goals", Download Toolkit, Strategic Talent Management, Date Unknown, downloaded Oct. 19, 2016, http://www.halogensoftware.com/learn/how-to/using-weighting-to-prioritize-competencies-and-goals, 6 pp.

(Continued)

*Primary Examiner* — Shahid A Alam
(74) *Attorney, Agent, or Firm* — Fletcher Yoder, P.C.

(57) ABSTRACT

A system includes a server device including a processor and a memory, the memory including instructions executable by the processor to: receive an indicator comprising an aggregation operation and an indicator criterion, wherein the indicator is included in the set of indicators; generate an indicator value associated with the indicator by applying the aggregation operation to a subset of the set of records identified using the indicator criterion; associate the subset of the set of records with the indicator value; apply a weight associated with the indicator to provide record weights associated with records of the subset of the set of records, wherein at least some of the provided record weights incorporate record weights provided based on other indicators of the set of indicators; and generate a priority list of records based on the record weights.

18 Claims, 5 Drawing Sheets

(56) References Cited

OTHER PUBLICATIONS

Savkin, Aleksey, "Not All KPIs are Equally Important, KPI Weight in BSC Designer", BSC Designer, Features, last updated Jan. 16, 2015, downloaded Oct. 19, 2016, http://www.bscdesigner.com/kpi-weight-bsc-designer.htm, 12 pp.

IBM Knowledge Center, "Aggregation", Version 1.1.1, Provides Information about aggregation process, Date Unknown, downloaded Oct. 19, 2016, http://www.ibm.com/support/knowledgecenter/SSCVHB_1.1.1/analytics/cnpi_analytics_productoverview_analytics.html, 1 page.

IBM Knowledge Center, "What Is a Weighted KPI Calculations", Version 9.0.2, Date Unknown, downloaded Oct. 19, 2016, http://www.ibm.com/support/knowledgecenter/SS2MBL_9.0.2/cxViewUser/cxView/UserGuide/WeightedKPICalculations.html, 1 page.

Arsan, Arcan, "SCRC Article Library: Performance Measurements and Metrics: An Analysis of Supplier Evaluation", Supply Chain Resource Cooperative (SCRC), Published Jan. 24, 2011, downloaded Oct. 19, 2016, https://scm.ncsu.edu/scm-articles/article/performance-measurements-and-metrics-an-analysis-of-supplier-evaluation#2, 4 pp.

* cited by examiner

GENERATING A PRIORITY LIST OF RECORDS USING INDICATOR DATA

TECHNICAL FIELD

This disclosure relates in general to systems and techniques for generating a priority list of records using indicator data.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Most individuals and organizations, such as businesses and governmental agencies, utilize computers on a daily basis to perform a variety of functions. These functions may include, for example, email, internet access, word processing, computer-aided design, media streaming, and many others. Indeed, individuals and organizations not only utilize their own computers to perform these functions, but since many of the functions are "cloud-based" most individuals and organizations utilize servers in data centers around the globe to perform many of these functions.

As organizations grow, the number of users and, thus, computers and associated devices, such as file servers, email servers, routers, etc., increase as well. These computers and associated devices can be used to provide computerized services to users, such as e-mail services, accounting services, web-based services, expense system services, and the like. Hence, many organizations utilize performance management tools to manage such systems. The performance management tools may include policies, processes, and procedures to measure performance of the computers and associated functionalities for an organization. For example, performance management tools may measure performance of disparate systems within an organization, which can include user computers and associated services, software, servers, routers, etc. The performance management tools may periodically analyze and display information relating to the measured performance, which can include disparate information associated with the disparate systems within the organization.

BRIEF DESCRIPTION OF THE DRAWINGS

The description herein makes reference to the accompanying drawings, wherein like reference numerals refer to like parts throughout the several views.

DETAILED DESCRIPTION

Figure 1:
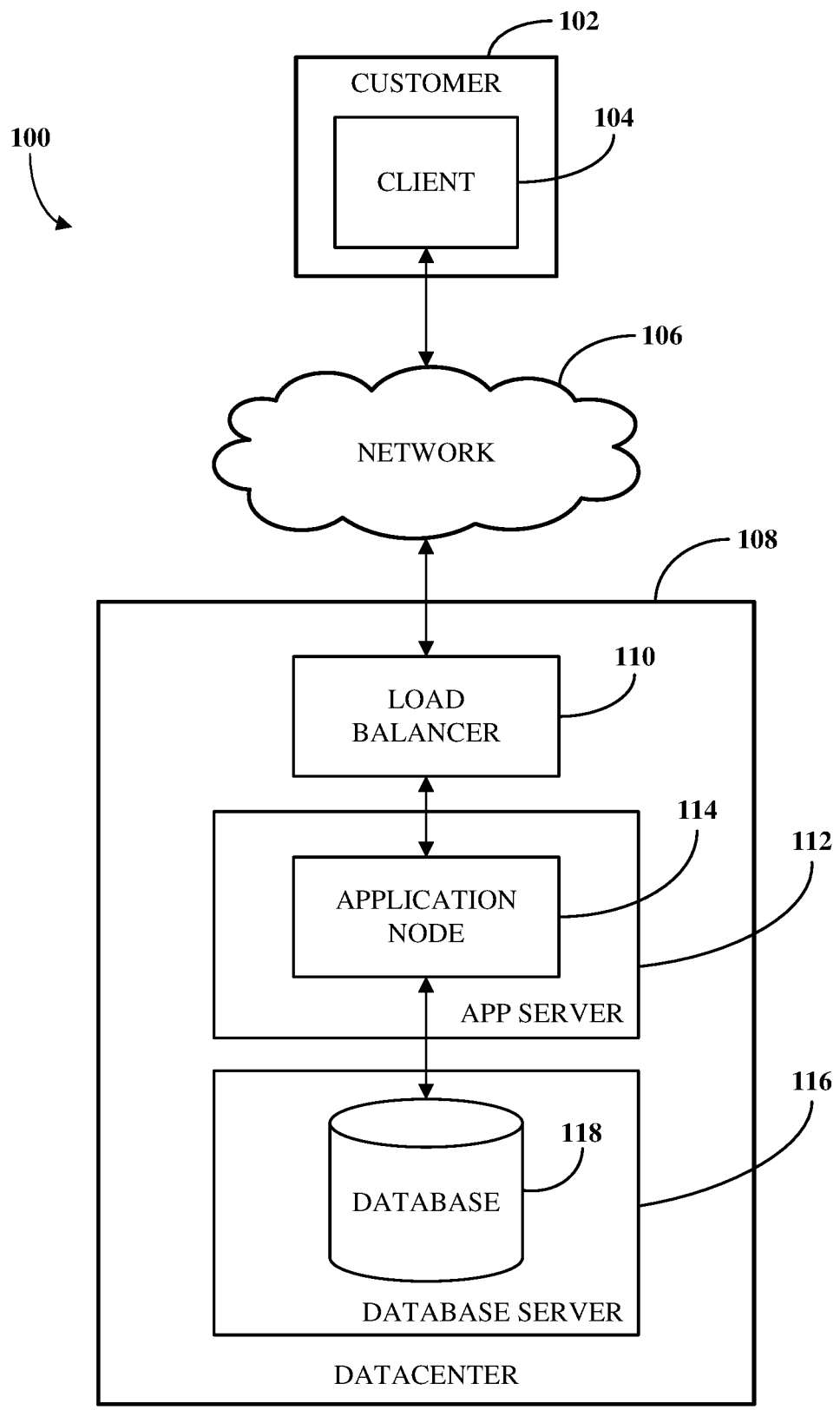
FIG. 1 is a block diagram of an example of an electronic computing and communications system.

In an electronic computing and communications system ("computing system"), indicators can be used to generate aggregate information about records of data (e.g., user data) in the computing system. Indicators can be used to provide a higher level view into the records than can be obtained by examining individual records. For example, for an incident management application, an indicator can be defined to generate a count of incident records having certain criteria. For example, an indicator could be defined to generate a count of open incident records. Such an indicator could also, for example, be defined to also generate breakdowns of open indicator records to also provide counts for open indicators based on days open, or provide counts for open indicators based on region.

An indicator can be defined using indicator definition data. Indicator definition data can include, for example, an aggregation operation (e.g., sum, count, max, or the like) and an indicator criterion (e.g., query criteria to locate records that should be aggregated) associated with an indicator. The indicator criterion, for example, can identify a table or other grouping of records (e.g., a table of records) and criteria (e.g., status, days open, assignee, and the like) used to select certain records from the table or grouping of records (e.g., to identify a set of records). The indicator definition data can be used to generate an indicator value (e.g., indicator data or aggregate information) for the indicator, such as by identifying records using the indicator criterion and applying the aggregation operation to those records. The records identified using the indicator criterion can be associated with the generated indicator value, such as by using unique identifiers for the records. Such an association can permit inspection and identification of records implicated by an indicator at the time the indicator value was generated.

Any number of indicators can be defined using indicator definition data (though, there may be technical or imposed constraints on the number of indicators, such as based on system performance constraints). Such indicators can relate to the same set of records or different set of records available to the computing system. For example, indicators may be defined for sets of records for different applications provided by the computing system (e.g., a service management application, an operations management application, a software development application, or the like). The records for different applications may include disparate data. For example, records for a service management application may be stored in one database structure (e.g., database schema, tables, columns, or the like) and records for an operations management application may be stored in another database structure (e.g., a different database schema).

Weights can be associated with respective indicators to permit prioritization of records using the indicators (e.g., using weight definition data). For example, a large weight might be associated with an indicator indicating that an incident is critical and has been open for 30 days or an indicator for a software development task that is high priority and is delinquent by 15 days. For example, a smaller weight might be associated with an indicator indicating that an incident is open past its due date or an indicator indicating that a change was not implemented by its due date.

Weights can be applied to records based on the association of records to an indictor value generated using an indicator having associated weight(s). For example, for an indicator for counting open incidents, the indicator may have been used to generate an indicator value indicating that there were 500 open incidents at a particular time. In the context of generating the indicator value, the 500 open incident records can be associated with the indicator value. Later, when weights are applied to records, a weight (e.g., 100) for the indicator for counting open incidents can be identified and applied to the 500 open incident records associated with the indicator value. The application of the weight can include providing a record weight for those records (e.g., by associating the record weight with the respective unique identifiers of the records). For example, if no record weight is already associated with the record, the record weight will be the weight associated with the indicator. If a record weight is already associated with the record, the record weight can be updated by adding the weight associated with the indicator to the record weight already associated with the record.

The above process can be iteratively or recursively applied to records, such as by iteratively identifying all or a subset of weights associated with indicators and applying those weights to records. As a result, individual records can be provided with record weights indicating a priority of those records as indicated by the combinations of indicators to which the individual records are associated. The records can be ordered based on the respective record weights associated with the records. Such an ordering can be used, for example, to generate a priority list of records (e.g., with higher priority records being identified based on larger record weights).

Such a process may be useful for systems that include indicators for aggregating data about records, systems that include disparate data, or combinations thereof. For example, it may be difficult to compare records having disparate data because of their different database structures. For example, data associated with a first application may have a different context or meaning than data associated with a second application. Because of this, it may be difficult to prioritize records between applications.

The techniques for prioritizing records using indicators described herein can be used to mitigate or overcome challenges relating to prioritizing records from disparate data sources. For example, a system that includes indicators and generating indicator values for indicators may be implemented such that indicators can be applied to disparate data for different applications. Thus, the indicators can be used to provide a common framework for evaluating records from disparate data sources. For example, weights can be associated with the indicators associated with the disparate data sources. The weights can be applied to respective records of the disparate data sources associated with indicator values generated based on the indicators. The common application of weights across disparate data sources can provide a common scheme of record weights across the disparate data, thus permitting the generation of a common priority list of records for the disparate data.

Implementations of this disclosure provide technological improvements particular to computer networks, for example, those concerning generating a priority list of records. Computer network-specific technological problems, such as organizing records on a priority list, can be wholly or partially solved by implementations of this disclosure such as by applying weights to records used to generate indicator values. Such techniques can be used to prioritize records across disparate sources of data. Implementations of this disclosure can thus introduce new and efficient improvements in the ways in which records are organized on a priority list of records by organizing the records on the priority list by weights associated with the records.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can be a public entity, private entity, or other corporate entity or individual that purchases or otherwise uses services of a software provider, such as a software-as-a-service ("SaaS") provider or a platform-as-a-service ("PaaS") provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. A client 104 associated with the customer 102 may connect to the network 106 via a communal connection point, link, or path and a client 104 associated with the customer 102 can connect to, or communicate via, the network 106 using a distinct connection point, link, or path. A connection point, link, or path can be wired, wireless, use other communications technologies, or a combination thereof.

The network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Any number of application servers or database servers can be implemented at the datacenter 108. The datacenter 108 can include servers other than or in addition to the application server 112 or the database server 116, for example, a web server.

The application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. The application nodes implemented on a single application server 112 can run on different hardware servers.

The database server 116 can be configured to store, manage, or otherwise provide data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100 can include an XML database and a CMDB. While limited examples are described, the database 118 can be configured as or comprise any suitable database type. Further, the system 100 can include one, two, three, or any suitable number of databases configured as or comprising any suitable database type or combination thereof.

The database 118 can be configured as a CMDB. A CMDB can include a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI. The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

The system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
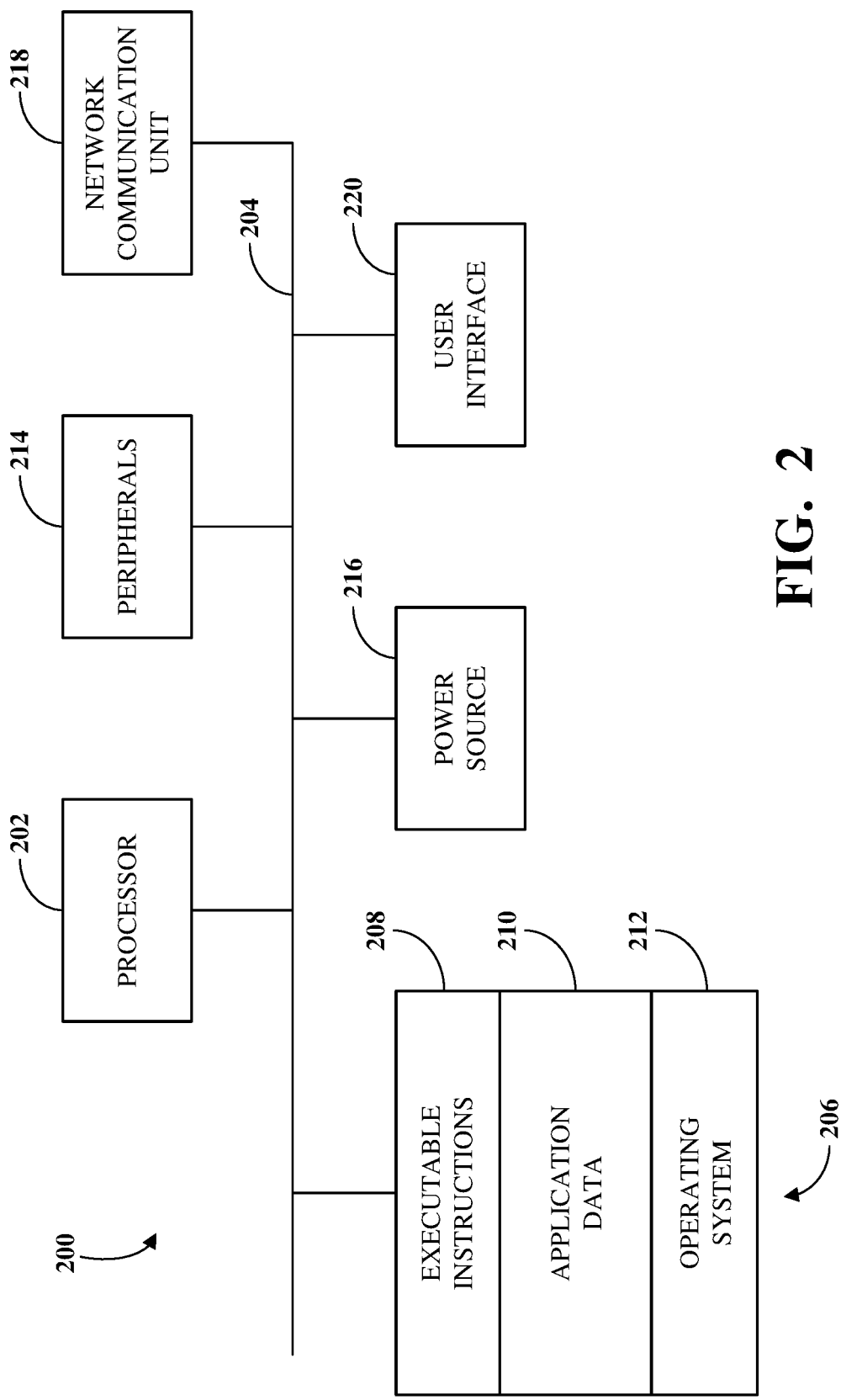
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to generate a priority list of records. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage. The memory 206 can be distributed across multiple clients or servers, such as network-based memory or memory in multiple clients or servers performing the operations of clients or servers.

The peripherals 214 can be coupled to the processor 202 via the bus 204. The peripherals can be sensors or detectors, or devices containing any number of sensors or detectors, which can monitor the computing device 200 itself or the environment around the computing device 200. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214. The operations of the processor 202 can be distributed across multiple clients or servers, which can be coupled directly or across a local area or other suitable type of network.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. The user interface 220 can include a display, which can be a liquid crystal display (LCD), a cathode-ray tube (CRT), a light emitting diode (LED) display (e.g., an OLED display), or other suitable display. Although depicted here as a single bus, the bus 204 can be composed of multiple buses, which can be connected to one another through various bridges, controllers, or adapters.

Figure 3:
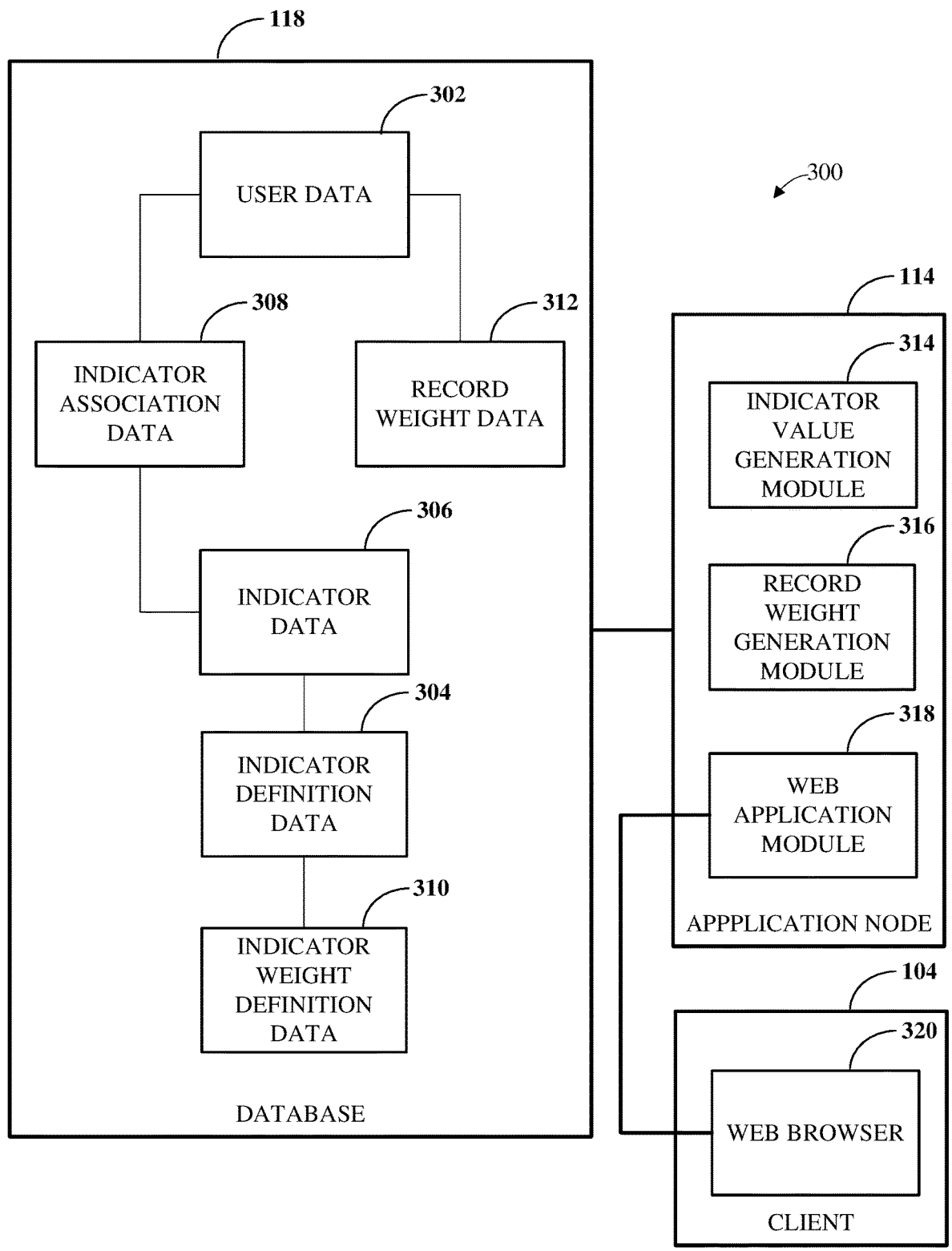
FIG. 3 is a block diagram of an example priority list of records generation system.

FIG. 3 is a block diagram of an example of a priority list of records generation system 300 ("system 300"). System 300 can, for example, be implemented using an implementation of the electronic computing and communications system 100 ("computing system") of FIG. 1 or one or more implementations of computing devices 200 of FIG. 2. In such an implementation, system 300 can include a client, such as the client 104 of FIG. 1, an application node, such as the application node 114 of FIG. 1, a database, such as the database 118 of FIG. 1, or combinations thereof.

The database 118 can include user data 302, indicator definition data 304, indicator data 306, indicator association data 308, indicator weight definition data 310, record weight data 312, or combinations thereof. The components of database 118 can be implemented, for example, using tables in a relational database system or using other suitable database technologies.

The user data 302 can include records of information associated with various applications of the computing system 100. Records stored in the user data 302 can include information about a service management application, an operations management application, a software development application, or other suitable applications provided by the computing system 100. Information stored in the records can be captured or collected from users associated with the computing system 100, from components associated with the computing system 100, integrations with other computing systems, other suitable data sources, or combinations thereof.

For example, the records stored in the user data 302 can include incident records that include information for an incident management application, which can, for example, be associated with the service management application. Such an incident record can include information about a system or service interruption associated with components of the computing system 100. For example, an email delivery service associated with the computing system 100 can be interrupted by a fault associated with a component of the computing system 100 that supports the email delivery service and incident record(s) can be generated and stored in the user data 302 resulting from that fault (e.g., automatically, by IT support staff, by a user, in response to a complaint by a user, or the like). A record in the user data 302 can include a unique identifier. The unique identifier can include a unique text string, such as a globally unique identifier (guid). The unique text string can include a unique combination of numbers, a unique combination of letters, or combinations numbers and letters. The unique identifier can be used to identify a record in the user data 302.

Sets of records in the user data 302 can represent respective applications provided by the computing system 100. For example, a first set of records can include information about the service management application, a second set of records can include information about the operations management application, and a third set of records can include information about the software development application. The sets of records for different applications may include disparate data. For example, a set of records for a service management application may have one database structure (e.g., database schema, tables, columns, or the like) and a second set of records for an operations management application may have another database structure (e.g., a different database schema).

The indicator definition data 304 can include a plurality of indicator records. An indicator record (which can also be referred to as an indicator definition record) can define an indicator. An indicator can be, for example, a metric or key performance indicator. For example, an indicator can be used to generate an indicator value from records stored in the user data 302. The indicator can, for example, indicate a measurement of performance of components of the computing system 100, a measurement of performance of users associated with the computing system 100, other suitable measurements of performances, or combinations thereof. For example, an indicator record can include an aggregation operation and an indicator criterion associated with an indicator.

The aggregation operation can include a sum, count, max, or other suitable operation. The indicator criterion can include query criteria to locate records in the user data 302 that can be aggregated. The indicator criterion can identify a table or other grouping of records (e.g., a set of records) and criteria (e.g., status, days open, assignee, and the like) used to select certain records from the set of records. The indicator record can be used to generate an indicator value (e.g., indicator data or aggregate information) for the indicator. For example, the indicator record can be used to generate an indicator value by identifying a set of records using the indicator criterion and applying the aggregation operation to the identified set of records. For example, an indicator record can include a count operation and an indicator criterion that can be used to identify incident records having an open status. The indicator record, when applied to the user data 302, can be used to generate an indicator value that includes a count of the open incident records. The indicator value can be stored in the indicator data 306.

The indicator data 306 can include a plurality of indicator values. An indicator value can be associated with an indicator. For example, an aggregation operation associated with an indicator record in the indicator definition data 304 can be applied to records in the user data 302 identified based on an indicator criterion associated with the indicator record. An indicator value can include a result of the aggregation operation being applied to a set of records in the user data 302. For example, the aggregation operation can include a count operation. The indicator criterion can be used to identify a set of records in the user data 302 that can be used to generate the indicator value. The set of records can include incident records having an open status (e.g., selected from records that include information about the service management application). The indicator value can include a value representing a count of the open incident records. The indicator value can be stored in the indicator data 306. The storing of the indicator value can include associating the indicator value with the indicator record that it was generated from. The association between the indicator value and the indicator record can be made, for example, by storing a unique identifier of the indicator record in the indicator data 306.

The indicator association data 308 can include a plurality of indicator association records. An indicator association record can be used to associate an indicator value with records used to generate the indicator value. For example, as described above, a set of records in the user data 302 can be used to generate an indicator value. An indicator association record in the indicator association data 308 can associate an indicator value with a record of the set of records used to generate the indicator value by including a unique identifier corresponding to the indicator value and a unique identifier corresponding to the record used to generate the indicator value.

For example, a unique identifier corresponding to first record associated with the set of records that includes open incident records in the user data 302 can be stored in a first indicator association record in the indicator association data 308. A unique identifier corresponding to the indicator value generated based on the records in the set of records in the user data 302 can be stored in the first indicator association record in the indicator association data 308. Further, a unique identifier corresponding to a second record associated with the set of records can be stored in a second indicator association record in the indicator association data 308. The unique identifier corresponding to the indicator value can be stored in the second indicator association record in the indicator association data 308. Accordingly, records used to generate an indicator value can be identified as being associated with the indicator value based on information stored in respective indicator association records in the indicator association data 308.

An indicator can be assigned or be associated with a weight. Weights can be associated with respective indicators to permit prioritization of records using the indicators. An indicator weight definition record in the indicator weight definition data 310 can be used to associate a weight to an indicator. An indicator association record can include a weight and a unique identifier associated with an indicator. A weight can indicate a priority of an associated indicator. For example, a large weight might be associated with an indicator indicating that an incident is critical and has been open for 30 days or an indicator for a software development task that is high priority and is delinquent by 15 days. In another example, a smaller weight might be associated with an indicator indicating that an incident is open past its due date or an indicator indicating that a change was not implemented by its due date.

A weight can be associated with records used to generate an indicator value. For example, as described above, an indicator value can be associated with an indicator. An indicator weight definition record in the indicator weight definition data 310 can include a weight and a unique identifier identifying the indicator. A set of records in the user data 302 can be used to generate the indicator value associated with the indicator. The weight associated with the indicator (e.g., which is associated with the indicator value) can be applied to records in the set of records.

A record weight record in the record weight data 312 can be used to associate a weight with a record used to generate the indicator value. For example, a record weight record in the record weight data 312 can include a record weight and a unique identifier associated with a record used to generate an associated indicator value. A record weight can include the weight associated with the indicator (e.g., associated with the indicator value). In some examples, the record weight associated with a record in the user data 302 can include an aggregation of weights associated with respective indicators (e.g., associated with respective indicator values) that the record in the user data 302 was used to generate.

Modules (such as indicator value generation module 314, record weight generation module 316, and web application module 318) of system 300 can be implemented as part of platform software running on a datacenter, such as the datacenter 108. The platform software can be part of a Platform-as-a-Service (PaaS) which can be provided, for example using datacenter 108 of the computing system 100. In some examples, the modules of system 300 can be part of or associated with the platform software (e.g., software components associated with the platform software), scripts stored on the datacenter 108 that are executed by the platform software, or combinations thereof. For example, a record weight generation module 316 can be implemented using a script stored in database 118 and executed by application node 114. As another example, the record weight generation module 316 can be implemented using Java, C, or a similar programming language, that can be compiled or interpreted and included in or associated with the platform software. The platform software can execute the modules of system 300 such as record weight generation module 316.

The indicator value generation module 314 can be configured to generate indicator values based on an indicator record in the indicator definition data 304 and records in the user data 302. For example, the indicator value generation module 314 can identify a set of records in the user data 302 based on an indicator criterion associated with an indicator record in the indicator definition data 304. The set of records can include, for example, open incident records in the user data 302. The indicator value generation module 314 can apply an aggregation operation associated with the indicator record to the set of records. For example, the aggregation operation can include a count operation. The indicator value generation module 314 can generate an indicator value by counting the number of records in the set of records. The indicator value generation module 314 can store the indicator value and a unique identifier associated with the indicator value in the indicator data 306.

The indicator value generation module 314 can associate records used to generate an indicator value with the indicator value. For example, the indicator value generation module 314 can generate an indicator association record that includes a unique identifier corresponding to an indicator value generated by the indicator value generation module 314 and a unique identifier corresponding to a record used to generate the indicator value. The indicator value generation module 314 can generate indicator association records for all records used to generate indicator values. The indicator value generation module 314 can store the indicator association records in the indicator association data 308.

The indicator value generation module 314 can, in some implementations, generate indicator values for all indicators associated with the computing system 100 or for groups of related indicators associated with the computing system 100. For example, the indicator value generation module 314 can generate an indicator value for all of the indicator records stored in the indicator definition data 304. In another example, the indicator value generation module 314 can generate indicator values for a group of related indicator records in the indicator definition data 304. A group of related indicators can include indicators identified as being related. For example, a user associated with the computing system 100 can identify a group of indicators.

The group of identifiers can be identified using unique identifiers associated with the indicator records of the group. The indicator value generation module 314 can identify indicator records in the indicator definition data 304 associated with the group of indicators based on the unique identifiers. The indicator value generation module 314 can generate the indicator values associated respective ones of the group of indicators based on the indicator records. The indicator value generation module 314 can store the indicator values in the indicator data 306.

The record weight generation module 316 can generate record weight records based on the indicator weight definition records in the indicator weight definition data 310 and the indicator association records in the indicator association data 308. For example, the record weight generation module 316 can identify an indicator weight definition record in the indicator weight definition data 310. The indicator weight definition record can include a weight and a unique identifier associated with an indicator. For example, the unique identifier can correspond to an indicator that represents a count of open incident records in the user data 302. The record weight generation module 316 can identify indicator values in the indicator data 306 that are associated with the indicator by identifying indicator values that include a reference to the unique identifier associated with the indicator. For example, the record weight generation module 316 can identify an indicator value that corresponds to the indicator that represents the count of open incident records in the user data 302.

In some examples, the indicator data 306 can include multiple indicator values that correspond to an indicator. For example, a first indicator value corresponding to the indicator that represents the count of open incident records in the user data 302 can include a first count of the open incident records in the user data 302 at a first point in time and a second indicator value corresponding to the indicator can include a second count of the open incident records in the user data 302 at a second point in time. A first set of records in the user data 302 can be used to generate the first indicator value (e.g., the open incident records in the user data 302 at the time of the first point in time) and a second set of records in the user data 302 can be used to generate the second indicator value (e.g., the open incident records in the user data 302 at the time of the second point in time).

The record weight generation module 316 can identify indicator association records in the indicator association data 308 that correspond to the identified indicator values. The record weight generation module 316 can identify indicator association records in the indicator association data 308 that include a reference to unique identifiers associated with the respective ones of the identified indicator values. The record weight generation module 316 can identify unique identifiers corresponding to records associated with the identified indicator values based on unique identifiers corresponding to records that are referenced in respective ones of the indicator association records. For example, the record weight generation module 316 can identify a record used to generate the indicator value corresponding to the indicator representing the count of open incident records in the user data 302 by using the unique identifier associated with the record.

The record weight generation module 316 can generate a record weight record that includes a record weight and a unique identifier corresponding to a record associated (e.g., used to generate) an identified indicator value. For example, the record weight generation module 316 can apply the weight associated with the indicator weight definition data 310 to the records used to generate an identified indicator value by generating a record weight record that includes a record weight equal to the weight and a unique identifier associated with a record used to generate the indicator value. However, if a record weight already exists for the record, the weight can be added to the existing weight. The record weight generation module 316 can store the record weight record in the record weight data 312.

Various sets of records in the user data 302 can include disparate data. For example, a first set of records in the user data 302 can include records associated with the service management application and a second set of records in the user data 302 can include records associated with the operations management application. Further, a first set of records can include records associated with an incident management application and records associated with a change management application. For example, an incident record can include information about a service interruption to an e-mail service associated with the computing system 100 and a change record can include information about a change to a component associated with the computing system 100 that addresses at least part of the service interruption to the e-mail service. A set of records associated with the service management application can have one database structure (e.g., database schema, tables, columns, or the like) and a set of records for the operations management application can have another database structure (e.g., a different database schema).

While the various sets of records in the user data 302 can include disparate data, disparate records in the user data 302 can be related. It can be difficult to compare records having disparate data because of their different database structures. For example, data associated with a first application may have a different context or meaning than data associated with a second application. Because of this, it may be difficult to prioritize records between applications. In some implementations, indicators can be applied to disparate data for different applications. For example, indicator values associated with the indicators can be generated based on records that include disparate data.

An indicator weight definition record in the indicator weight definition data can include a weight and a unique identifier associated with an indicator applied to disparate data sources. The record weight generation module 316 can apply the weight to records used to generate the indicators by generating record weight records that include a record weight corresponding to the weight associated with the indicator and a unique identifier associated with a record used to generate the indicator. The record weight generation module 316 can generate record weight records corresponding to respective records of the disparate data sources associated with indicator values (e.g., associated with the indicators). The common application of weights across disparate data sources can provide a common scheme of record weights across the disparate data.

Records used to generate some indicator values can be used to generate other indicator values. For example, a first set of records can include open incident records in the user data 302. The first set of records can be used to generate a first indicator value. For example, the first indicator value can include a value that represents a count of the first set of records (e.g., a count of the open incident records in the user data 302). A second set of records in the user data 302 can include open incidents that have been open more than 30 days. The second set of records can be used to generate a second indicator value. For example, the second indicator value can include a value that represents a maximum priority of the incident records that have been open more than 30 days. In the example, records in the second set of records (e.g., open incident records that have been open more than 30 days) include records in the first set of records (e.g., all open incident records).

It can be advantageous or desirable to increase a prioritization of records that are used to generate more than one indicator value. In some implementations, the record weight generation module 316 can update record weights associated with records used to generate more than one indicator value. For example, the record weight generation module 316 can update a record weight associated with a record used to generate more than one indicator value by aggregating weights associated with the more than one indicator values.

As described above, the record weight generation module 316 can generate record weight records that include a record weight and a unique identifier corresponding to a record used to generate an indicator value. The record weight generation module 316 can be configured to determine whether a record weight record in the record weight data 312 includes the unique identifier corresponding to the record. For example, the record weight generation module 316 can compare the unique identifier corresponding to the record to unique identifiers referenced in record weight records in the record weight data 312. When the record weight generation module 316 determines that no record weight records in the record weight data 312 include a reference to the unique identifier associated with the record, the record weight generation module 316 stores the record weight record in the record weight data 312, as described above.

When the record weight generation module 316 identifies a record weight record that includes a reference to the unique identifier corresponding to the record, the record weight generation module 316 can add the weight associated with the indicator (e.g., associated with the indicator value) that the record was used to generate to a record weight associated with the record weight record in the record weight data 312. For example, the record weight generation module 316 could have generated the record weight record in the record weight data 312 in response to the record weight generation module 316 identifying the record (e.g., referenced by the record weight record) as being used to generate another indicator value. By identifying record weight records that include a reference to a unique identifier corresponding to a record, the record weight generation module 316 can increase a prioritization of the record when the record is used to generate more than one indicator value (e.g., by adding weights associated with respective ones of the more than one indicator value to the record weight associated with the record). The record weight generation module 316 can store generated record weight records in the record weight data 312.

In some examples, the record weight generation module 316 can iteratively or recursively apply weights to records used to generate indicator values by iteratively identifying all or a subset of indicator weight definition records in the indicator weight definition data 310 associated with indicators (e.g., associated with the indicator values). The record weight generation module 316 can apply weights associated with the indicator weight definition records to records identified as being used to generate respective ones of the indicator values. The record weight generation module 316 can generate record weight records based on the weights and respective ones of the records identified as being used to generate respective indicator values.

In some implementations, the record weight generation module 316 can be configured to generate a priority list of records based on the record weight records in the record weight data 312. For example, the record weight generation module 316 receive a request to generate a priority list of records based on the record weight records in the record weight data 312. The record weight generation module 316 can generate a priority list of records according to record weights associated with record weight records. The priority list of records can include a list of unique identifiers associated with records used to generate indicator values and an associated record weight. The priority list of records can, for example, be organized in descending order according to the record weights.

The record weight generation module 316 can generate the priority list of records based on a threshold weight. For example, the record weight generation module 316 can receive a request to generate the priority list of records. The request can include a weight threshold. The weight threshold can correspond to a minimum weight value. The record weight generation module 316 can identify record weight records that include a record weight is equal to or exceeds the threshold weight. The record weight generation module 316 can generate the priority list of records, as described, by using record weight records that include record weights that are equal to or exceed the threshold weight.

The record weight generation module 316 can periodically generate the priority list of records. For example, the record weight generation module 316 can generate a priority list of records nightly, weekly, monthly, or other suitable periodic basis. The record weight generation module 316 can generate the priority list of records as described above.

The web application module 318 can be configured to communicate the priority list of records to the client 104. The client 104 can include a web browser 320. The web browser can be used to access a web page configured to display the priority list of records. For example, the client 104 can include a display device. An administrator or other user associated with the computing system 100 can use the display device to review the priority list of records displayed on the web page via the web browser 320. In some examples, the administrator or user can identify records that the administrator or user should address before other records on the priority list of records. For example, records at or near the top (e.g., records having a larger record weight) of the priority list of records are prioritized higher than records below the top of the priority list of records. Accordingly, the administrator or user can identify records that should be addressed before other records based on whether the records are at or near the top of the priority list of records.

Implementations of the priority list of records generation system 300 shown in FIG. 3 can include additional, less, combined, or other functionality, or combinations thereof, different from those described above. In some implementations, the record weight generation module 316 can generate the priority list of records on demand. For example, an administrator or other user associated with the computing system 100 can generate a request for the priority list of records. The administrator or user can use the client 104 to generate the request. The client can communicate the request to the web application module 318. The web application module 318 can communicate the request to the record weight generation module 316. The request can include a list of unique identifiers corresponding to respective indicator values or the request can reference a stored list of unique identifiers corresponding to respective indicator values. The record weight generation module 316 can generate the priority list of records in response to the request. In some implementations, the web application module 318 can communicate the priority list of records to an administrator or other use associated with the computing system 100. For example, the web application module 318 can generate an e-mail message, text message, other suitable message, or combinations thereof that includes the priority list of records.

Figure 4:
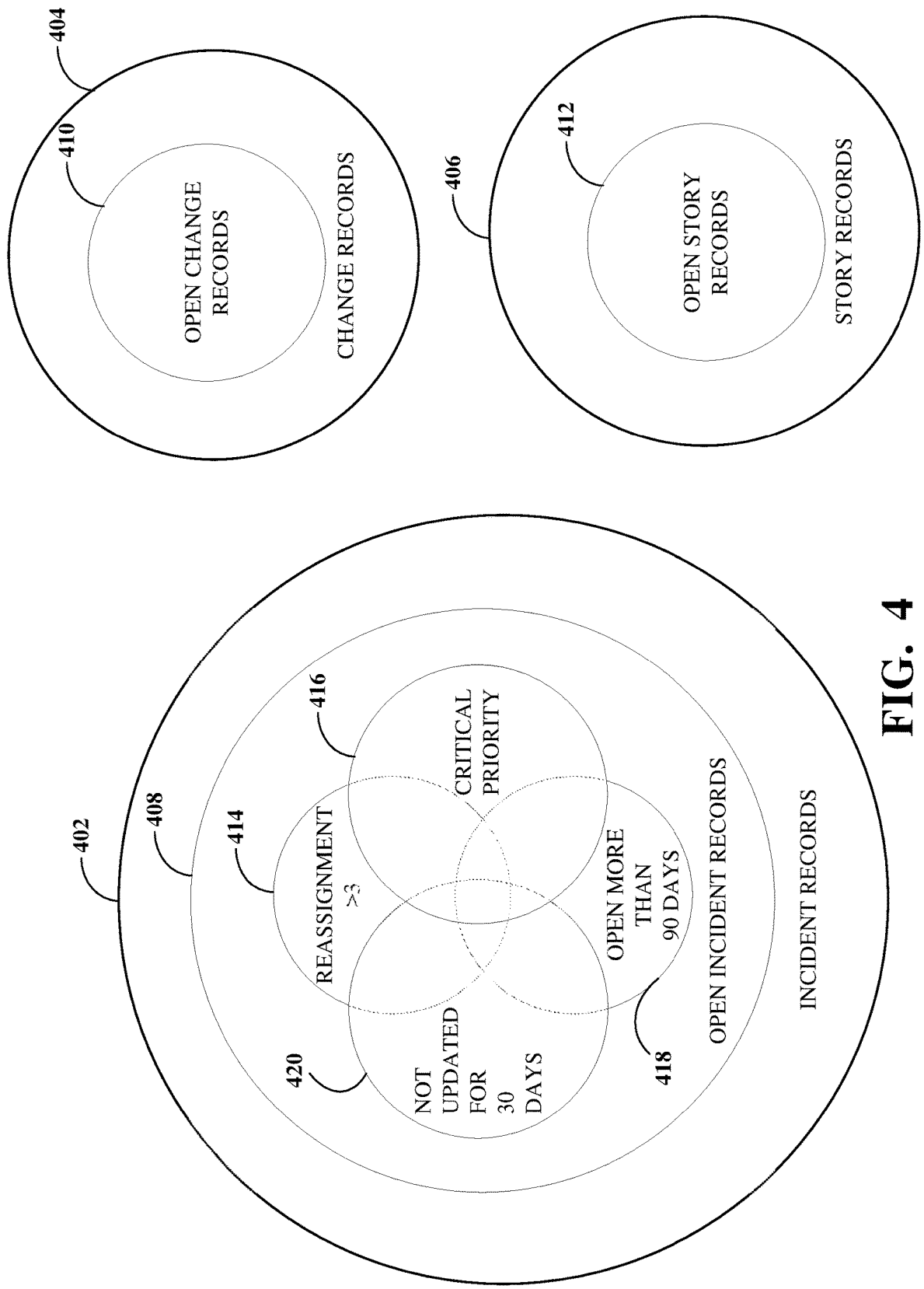
FIG. 4 is a diagram illustrating relationships between various sets of records associated with the electronic computing and communication system of FIG. 1.

FIG. 4 is a diagram illustrating relationships between various sets of records associated with the electronic computing and communication system 100 ("computing system") of FIG. 1. As described above, the user data 302 can include a plurality of records that include information about various aspects of the computing system 100. For example, incident records can include information associated with an incident management application, change records can include information about a change management application, story records can include information associated with a software development application, event records can include information associated with an event management application, human resources records can include information about a human resources application, and so on. Sets of records in the user data 302 can be used to generate indicator values associated with respective indicators. For example, an indicator can represent a count of open incident records. An indicator value associated with the indicator can include a value that represents a count of the open incident records in the user data 302.

In some examples, as described above, various sets of records in the user data 302 can include disparate data. For example, a first set of records in the user data 302 can include records associated with the service management application and a second set of records in the user data 302 can include records associated with the operations management application. Further, a first set of records can include records associated with an incident management application and records associated with a change management application. For example, an incident record can include information about a service interruption to an e-mail service associated with the computing system 100 and a change record can include information about a change to a component associated with the computing system 100 that addresses at least part of the service interruption to the e-mail service. A set of records associated with the service management application can have one database structure (e.g., database schema, tables, columns, or the like) and a set of records for the operations management application can have another database structure (e.g., a different database schema).

As generally illustrated in FIG. 4, the user data 302 can include incident records 402 that can include information associated with an incident application, change records 404 that can include information associated with a change application, or story records 406 that can include information about a software development application. As described above, the user data 302 can include other records relating to other applications. Open incident records 408 represents a set of records in the user data 302 can that be used to generate an indicator value associated with an indicator that represents information associated with the incident records 402. For example, the indicator can represent a count of the open incident records 408. Open change records 410 represents a set of records in the user data 302 that can be used to generate an indicator value associated with an indicator that represents information associated with the change records 404. For example, the indicator can represent a count of the open change records 410. Story records 406 can represent a set of records in the user data 302 that can be used to generate an indicator value associated with an indicator that represents information associated with the story records 406. For example, the indicator can represent a count of the open story records 412.

As described above, records in the user data 302, such as the incident records 402, the change records 404, and the story records 406, can include disparate data. It can be difficult to compare records having disparate data because of their different database structures. For example, data associated with a change management application may have a different context or meaning than data associated with a software development application. In some implementations, indicators can be applied to records that include disparate data for different applications. For example, while not shown, an indicator can represent a count of the open incident records 408, the open change records 410, and the open story records 412. Additionally, or alternatively, records can similar information that may be represented differently for different applications. For example, incident records 402 can include a task field. The task field can include information associated with open tasks associated with an incident record. An open change record in the user data 302 can represent a change task (e.g., a change record itself is a task to implement a change on one or more components in the computing system 100). In some examples, an indicator can represent open incident records in the user data 302 that have an open task and open change records in the user data 302. The indicator value associated with the indicator can include a value that represents a count of the open incident records that include an open task and the open change records. In this manner, the indicator can be used to analyze information that can be represented differently in different records, but that can be related. For example, a count of the open incident records that include an open task and the open change records can represent records in the user data 302 that include a task.

In another example, records in the user data 302 can be used to generate more than one indicator value. For example, a first indicator can use a set of records 414 that includes open incident records that have been reassigned more than three times to represent a count of open incident records that have been reassigned more than three times. A second can use a set of records 416 that includes open incident records that have a critical priority (e.g., a value in a priority field equal to one) to represent a count of the open incident records having a critical priority. As is generally illustrated, some records used for the first indicator can be used for the second indicator. Similarly, a third indicator can use a set of records 418 that includes open incident records that have been open more than 90 days to represent a count of open incident records that have been open more than 90 days. As is generally illustrated, some of the records used for the third indicator can be used for the first and second indicators. A fourth indicator can use a set of records 420 that includes open incident records that have not been updated for more than 30 days to represent a count of open incident records that have not been updated for more than 30 days. As is generally illustrated, some of the records used for the fourth indicator can be used for the first, second, and third indicators.

As described above with respect to FIG. 3, the system 300 can apply weights to records used to generate various indicator values. The common application of weights across disparate data sources can provide a common scheme of record weights across the disparate data, thus permitting, for example, the generation of a common priority list of records for the disparate data. Additionally, as described above, the system 300 can increase the prioritization of records that are used to generate more than one indicator value. For example, the system 300 update a record weight associated with a record used to generate more than one indicator value by aggregating weights associated with the more than one indicator value.

Figure 5:
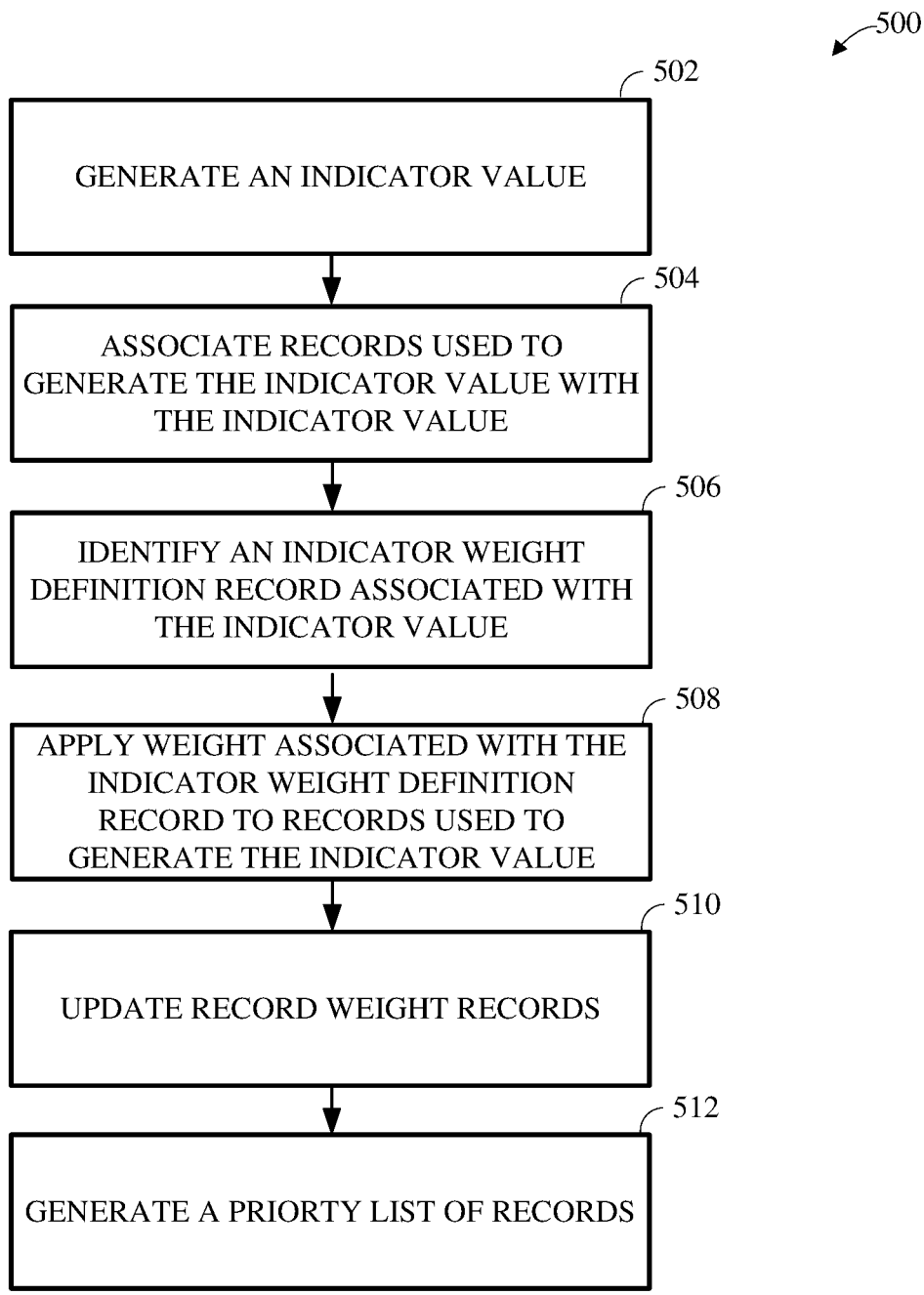
FIG. 5 is a flowchart illustrating an example of a technique for generating a priority list of records.

FIG. 5 is a flowchart illustrating an example of a technique 500 for generating a priority list of records in an electronic computing and communication system, such as the system 100 as generally illustrated in FIG. 1. In some implementations, the technique 500 can be executed using computing devices, such as the systems, modules, and devices described with respect to FIGS. 1, 2, and 3. In some implementations, the technique 500 can be performed, for example, by executing a machine-readable program or other computer-executable instructions, such as instructions or programs described according to JavaScript, C, or other such instructions. The steps, or operations, of the technique 500 or any other method, process, or algorithm described in connection with the implementations disclosed herein can be implemented directly in hardware, firmware, software executed by hardware, circuitry, or a combination thereof.

At operation 502, the technique 500 generates an indicator value. For example, as described above, the indicator value generation module 314 can receive a request to generate one or more indicator values associated with respective indicators. Additionally, or alternatively, the indicator value generation module 314 can generate one or more indicator values periodically. For example, the indicator value generation module 314 can be configured to generate indicator values nightly, weekly, monthly, or other suitable periodic basis. The indicator value generation module 314 can generate indicator values for all indicators associated with the computing system 100 or the indicator value generation module 314 can generate indicator values for a one or more groups of indicators. For example, as described above, the indicator value generation module 314 can receive a request to generate indicator values for one or more groups of indicators included with the request. In some examples, the indicator value generation module 314 can be configured to identify related indicators.

The indicator value generation module 314 can generate indicator values for the related indicators. As described above, the indicator value generation module 314 can generate an indicator value associated with an indicator based on an indicator record in the indicator definition data 304. For example, the indicator value generation module 314 can identify a set of records in the user data 302 based on an indicator criterion associated with the indicator record. The indicator value generation module 314 can generate the indicator value by applying an aggregation operation associated with the indicator record to the set of records. For example, the set of records can include open incident records and the aggregation operation can include a count operation. The indicator value generation module 314 can generate an indicator value that includes a value that represents a count of the open incident records in the user data 302. The indicator value generation module 314 can store generated indicator values in the indicator data 306.

In some examples, as described above, various sets of records in the user data 302 can include disparate data. For example, a first set of records in the user data 302 can include records associated with the service management application and a second set of records in the user data 302 can include records associated with the operations management application. Further, a first set of records can include records associated with an incident management application and records associated with a change management application. For example, an incident record can include information about a service interruption to an e-mail service associated with the computing system 100 and a change record can include information about a change to a component associated with the computing system 100 that addresses at least part of the service interruption to the e-mail service. A set of records associated with the service management application can have one database structure (e.g., database schema, tables, columns, or the like) and a set of records for the operations management application can have another database structure (e.g., a different database schema).

While the various sets of records in the user data 302 can include disparate data, records having disparate data in the user data 302 can be related. It can be difficult to compare records having disparate data because of their different database structures. For example, data associated with a first application may have a different context or meaning than data associated with a second application. Because of this, it may be difficult to prioritize records between applications. In some implementations, indicators can be applied to disparate data for different applications. For example, the indicator value generation module 314 can generate indicator values associated with the indicators based on records that include disparate data.

In some implementations, the indicator value generation module 314 can be configured to update indicator values based on changes to records in the user data 302 used to generate the indicator values. For example, the system 300 can include a record watcher. The record watcher can be configured to monitor records used to generate the indicator values. The record watcher can intercept database operations that affect records used to generate the indicator values. For example, a database operation can include operations to create a new record, delete a record, modify information stored in a record, or combinations thereof. The record watcher can communicate the database operation to the indicator value generation module 314. The indicator value generation module 314 can generate new indicator values based on the database operation. For example, the indicator value generation module 314 can be configured to identify indicator values that can be affected by the database operation (e.g., indicator values generated based on a record that can be affected by the database operation). The indicator value generation module 314 can generate new indicator values, as described above, for the identified indicator values.

At operation 504, the technique 500 associates records used to generate the indicator value with the indicator value. For example, as described above, the indicator value generation module 314 can associate an indicator value with a records used to generate the indicator value. The indicator value generation module 314 can generate an indicator association record that includes a unique identifier corresponding to the indicator value and a unique identifier corresponding to the record used to generate the indicator value. The indicator value generation module 314 can generate indicator association records for all records used to generate indicator values. The indicator value generation module 314 can store the indicator association records in the indicator association data 308. At 506, the technique 500 identifies an indicator weight definition record associated with the indicator value. For example, as described above, the record weight generation module 316 can identify an indicator weight definition record in the indicator weight definition data 310 that is associated with an indicator value generated by the indicator value generation module 314. The indicator weight definition record can include a weight and a unique identifier corresponding to an indicator. The record weight generation module 316 can identify indicator values in the indicator data 306 that are associated with the indicator. The record weight generation module 316 can identify records used to generate the indicator value based on indicator association records in the indicator association data 308. The record weight generation module 316 can identify indicator weight definition records corresponding to the indicators (e.g., and associated indicator values) associated with the computing system 100.

At operation 508, the technique 500 can apply a weight associated with the indicator weight definition record to records used to generate the indicator value. For example, as described above, the record weight generation module 316 can generate a first record weight record that includes a weight associated with an indicator weight definition record and a unique identifier corresponding to a record used to generate an indicator value associated with the indicator weight definition record. At operation 510, the technique 500 can update record weight records. For example, as described above, records can be used to generate more than one indicator value. The record weight generation module 316 can determine whether a record weight record in the record weight data 312 includes a reference to the unique identifier corresponding to the record used to generate the indicator. When the record weight generation module 316 determines that no record weight record includes a reference to the unique identifier corresponding to the record used to generate the indicator value, the record weight generation module 316 stores the first record weight record in the record weight data 312.

When the record weight generation module 316 determines that a record weight record in the record weight data 312 includes a reference to the unique identifier corresponding to the record used to generate the indicator value (e.g., a record weight record was previously created because the record used to generate the indicator value was used to generate at least one other indicator value), the record weight generation module 316 updates a record weight associated with the record weight record in the record weight data 312. For example, as described above, the record weight generation module 316 can update the record weight by adding the weight associated with the indicator weight definition record to the record weight.

In some examples, as described above, some records used to generate an indicator value can include disparate data. An indicator weight definition record in the indicator weight definition data 310 can include a weight and a unique identifier associated with an indicator applied to disparate data sources. The record weight generation module 316 can apply the weight to records used to generate the indicators by generating record weight records that include a record weight corresponding to the weight associated with the indicator and a unique identifier associated with a record used to generate the indicator. The record weight generation module 316 can generate record weight records corresponding to respective records of the disparate data sources associated with indicator values (e.g., associated with the indicators). The common application of weights across disparate data sources can provide a common scheme of record weights across the disparate data. The record weight generation module 316 can continue to generate record weight records or to update record weights associated with record weight records stored in the record weight data 312 for all records used to generate indicator values.

At operation 512, the technique 500 generates a priority list of records. For example, as described above, the record weight generation module 316 can generate a priority list of records based on the record weight records in the record weight data 312. For example, the record weight records can include a weight and a unique identifier corresponding to a record used to generate an indicator value, as described above. The record weight generation module 316 can generate a priority list of records that includes unique identifiers corresponding to records used to generate indicator values and a weight associated with respective ones of the records used to generate the indicator values. The record weight generation module 316 can organize the priority list of records according to weight. For example, the record weight generation module 316 can organize the record on the priority list of records in descending order according to weight. In another example, the record weight generation module 316 can organize the records on the priority list of records based on a weight threshold, as described above.

In some examples, the record weight generation module 316 can generate the priority list of records on demand. For example, the record weight generation module 316 can receive a request (e.g., from an administrator or a user associated with the computing system 100) to generate the priority list of records. In other examples, the record weight generation module 316 can be configured to generate the priority list of records periodically, for example, nightly, weekly, monthly, or other suitable periodic basis. The record weight generation module 316 can communicate the priority list of records to the web application module 318. The web application module 318 can communicate the priority list of records to the web browser 320. The web browser 320 can, as described above, be used to access a web page. The web page can be configured to display the priority list of records.

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for generating a priority list of records based on a set of indicators, the system comprising:
   a server device including a processor and a memory, the memory including instructions executable by the processor to:
   receive an indicator comprising an aggregation operation and an indicator criterion, wherein the indicator is included in the set of indicators;
   generate an indicator value associated with the indicator by applying the aggregation operation to a first set of records identified using the indicator criterion;
   associate records of the first set of records with the indicator value;
   apply a weight associated with the indicator to provide record weights associated with the records of the first set of records;
   apply a second weight associated with a second indicator to provide record weights associated with records of a second set of records associated with the second indicator;
   update the record weights associated with at least a portion of the first set of records such that the updated record weights incorporate weights associated with the second indicator; and
   generate the priority list of records based on the updated record weights, wherein the instructions to generate the priority list based on the updated record weights includes sorting the updated record weights associated with the portion of the records of the first set of records and the record weights associated with the second set of records.

2. The system of claim 1, wherein the first set of records includes information about a first application and the second set of records includes information about a second application.

3. The system of claim 2, wherein the first set of records and the second set of records include disparate data.

4. The system of claim 2, wherein the first set of records is associated with a first database structure and the second set of records is associated with a second database structure.

5. The system of claim 1, wherein records of the first set of records are associated with the indicator value using unique identifiers of the records of the first set of records and wherein the records of the second set of records are associated with the second indicator using unique identifiers of the second records of the second set of records.

6. The system of claim 1, wherein the instructions to update the record weights associated with the portion of the first set of records comprises instructions to:
   identify a first record weight for a first record of the first set of records;

apply the weight associated with the indicator to the first record by adding the first record weight to the weight associated with the indicator to generate an updated first record weight of the updated record weights for the first record; and store the updated first record weight.

7. A method for generating a priority list of records based on a set of indicators, the method comprising:

receiving an indicator comprising an aggregation operation and an indicator criterion, wherein the indicator is included in the set of indicators;

generating an indicator value associated with the indicator by applying the aggregation operation to a first set of records identified using the indicator criterion;

associating records of the first set of records with the indicator value;

applying a weight associated with the indicator to provide record weights associated with the records of the first set of records;

applying a second weight associated with a second indicator to provide second record weights associated with records of a second set of records associated with the second indicator;

updating the record weights associated with at least a portion of the first set of records such that the updated record weights incorporate weights associated with the second indicator; and generating the priority list of records based on the updated record weights, wherein generating the priority list of records based on the updated record weights includes sorting the updated record weights associated with the portion of the first set of records and the second record weights associated with the second set of records.

8. The method of claim 7, wherein the first set of records includes information about a first application and the second set of records includes information about a second application.

9. The method of claim 8, wherein the first set of records and the second set of records include disparate data.

10. The method of claim 8, wherein the first set of records is associated with a first database structure and the second set of records is associated with a second database structure.

11. The method of claim 7, wherein records of the first set of records are associated with the indicator value using unique identifiers of the records of the first set of records and wherein the records of the second set of records are associated with the second indicator using unique identifiers of the second records of the second set of records.

12. The method of claim 7, further comprising:

identifying a first record weight for a first record of the first set of records;

apply the weight associated with the indicator to the first record by adding the first record weight to the weight associated with the indicator to generate an updated first record weight for the first record; and storing the updated first record weight.

13. A non-transitory computer-readable storage medium, comprising executable instructions that, when executed by a processor, facilitate performance of operations, comprising:

receiving an indicator comprising an aggregation operation and an indicator criterion, wherein the indicator is included in a set of indicators;

generating an indicator value associated with the indicator by applying the aggregation operation to a first set of records identified using the indicator criterion;

associating records of the first set of records with the indicator value;

applying a weight associated with the indicator to provide record weights associated with records of the first set of records;

applying a second weight associated with a second indicator to provide record weights associated with records of a second set of records associated with the second indicator;

updating the record weights associated with at least a portion of the first set of records such that the updated record weights incorporate weights associated with the second indicator; and generating a priority list of records based on the updated record weights, wherein generating the priority list of records based on the updated record weights includes sorting the updated record weights associated with the portion of the first set of records and the record weights associated with the second set of records.

14. The non-transitory computer-readable storage medium of claim 13, wherein the first set of records includes information about a first application and the second set of records includes information about a second application.

15. The non-transitory computer-readable storage medium of claim 14, wherein the first set of records and the second set of records include disparate data.

16. The non-transitory computer-readable storage medium of claim 14, wherein the first set of records is associated with a first database structure and the second set of records is associated with a second database structure.

17. The non-transitory computer-readable storage medium of claim 13, wherein records of the first set of records are associated with the indicator value using unique identifiers of the records of the first set of records and wherein the second records of the set of records are associated with the second indicator using unique identifiers of the second records of the second set of records.

18. The non-transitory computer-readable storage medium of claim 13, the operations further comprising:

identifying a first record weight for a first record of the first set of records;

applying the weight associated with the indicator to the first record by adding the first record weight to the weight associated with the indicator to generate an updated first record weight for the first record; and storing the updated first record weight.

* * * * *